(12) United States Patent
De Rouck

(10) Patent No.: US 6,786,178 B2
(45) Date of Patent: Sep. 7, 2004

(54) FEED DISTRIBUTION SYSTEM FOR POULTRY

(75) Inventor: Danny De Rouck, Berlare (BE)

(73) Assignee: Roxell N.V., Maldegem (BE)

( * ) Notice: Subject to any disclaimer, the term of this patent is extended or adjusted under 35 U.S.C. 154(b) by 0 days.

(21) Appl. No.: 10/416,864

(22) PCT Filed: Nov. 15, 2001

(86) PCT No.: PCT/IB01/02159

§ 371 (c)(1),
(2), (4) Date: Sep. 22, 2003

(87) PCT Pub. No.: WO02/39811

PCT Pub. Date: May 23, 2002

(65) Prior Publication Data

US 2004/0050336 A1 Mar. 18, 2004

(30) Foreign Application Priority Data

Nov. 17, 2000 (NL) .............................. 1016638

(51) Int. Cl.⁷ .......................... A01K 5/02; A01K 39/04
(52) U.S. Cl. .................................. 119/57.4; 119/51.12
(58) Field of Search .................. 119/53, 57.4, 52.1, 119/52.4, 51.12, 56.1, 56.2, 57.2; D30/121, 122, 124

(56) References Cited

U.S. PATENT DOCUMENTS

| | | | | |
|---|---|---|---|---|
| 3,811,412 A | * | 5/1974 | Murto et al. | 119/53 |
| 4,200,060 A | * | 4/1980 | Van Daele | 119/56.2 |
| 4,488,509 A | | 12/1984 | Awalt | |
| 4,527,513 A | * | 7/1985 | Hart et al. | 119/51.5 |
| 4,722,301 A | * | 2/1988 | Strong | 119/57.4 |
| 4,815,417 A | * | 3/1989 | Strong | 119/57.4 |
| 5,101,765 A | * | 4/1992 | Manfrin | 119/53 |

FOREIGN PATENT DOCUMENTS

| | | | |
|---|---|---|---|
| EP | 0 951 825 A | | 10/1999 |
| FR | 2 678 480 A | | 1/1993 |
| FR | 2 680 949 A | | 3/1993 |
| JP | 11-341933 | * | 12/1999 |

* cited by examiner

Primary Examiner—Charles T. Jordan
Assistant Examiner—T. Nguyen
(74) Attorney, Agent, or Firm—Todd Deveau; Thomas, Kayden, Horstemeyer & Risley LLP

(57) ABSTRACT

A feed distribution system with feed dispensers (20), dispenser trays (22) of which have a convex edge (27) with successive edge areas (61) which have a relatively large radius of curvature and edge areas (62) which have a relatively small radius of curvature; a suitable shape in this connection is an elliptical shape a triangular shape, a hexagonal shape. The invention provides improved animal welfare, inter alia through a larger feeding space and also larger living space when the birds are not feeding. The invention further provides improved economic efficiency for the breeder, inter alia by reduced costs per bird.

16 Claims, 9 Drawing Sheets

FEED DISTRIBUTION SYSTEM FOR POULTRY

RELATED APPLICATION

This application claims priority to and the benefit of NL1016638 filed Nov. 17, 2000.

FIELD OF THE INVENTION

The present invention relates in its entirety to the feeding of poultry, such as chickens, turkeys etc., with feed that is substantially in powder form or granule form or the like, said birds in principle being able to run free in large poultry houses. Such poultry houses typically have dimensions of the order of 100 m×18 m.

BACKGROUND OF THE ART

Although in the case of feed systems for poultry there are differences depending on the type of birds for which the systems are intended, for example chickens or turkeys, and for example table chickens or mother chickens, there are also similarities. The present invention relates to an aspect of the distribution systems that is present in all such feed systems, namely their geometry.

These birds are fed with feed that is in powder form or granule form or the like. The feed systems have in common the fact that fixed feed dispensing points are present in the poultry house, and that the feed to be dispensed has to be conveyed from a central storage place to said feed dispensing points. For the conveyance of the feed to be dispensed from a central storage place to the feed dispensing points, a pipe conveyor system is present, which pipe conveyor system comprises one or more substantially horizontally directed feed conveyor pipes, which are disposed substantially parallel to each other, and which feed conveyor pipes are provided with means for conveying feed through them.

The feed distribution points are situated along the above-mentioned feed conveyor pipes, and in general have regular distances between them. Said regular distances between successive feed points of one feed conveyor pipe are generally shorter than the distances between feed conveyor pipes situated next to each other.

In this way the feed points normally define a regular grid pattern on the floor of the poultry house, which grid pattern is composed of rectangular cells whose corner points are defined by the feed points.

A feed dispenser is disposed at each feed point. A feed dispenser in its entirety comprises a tray on which feed comes to rest, which feed can be pecked off said tray by the birds, and also guide means for guiding a part of the feed out of the horizontal feed conveyor pipe and into the tray of the dispenser. Said guide means comprise in general a suitably dimensioned, substantially vertically oriented down pipe, the top end of which is connected to an outlet of the feed conveyor pipe, and the bottom end of which is situated above a central part of said tray. The down pipe is connected to the feed conveyor pipe by means of a connecting piece, and the tray is also connected to said connecting piece by means of arms. More particularly, the tray, the down pipe, the connecting piece and the arms form a modular unit that can be attached as a whole to a feed conveyor pipe.

In this way, during use feed is conveyed into the tray, which feed is pecked out of said tray by the birds. In order to do so, the birds stand in a circle around the tray.

Since the birds have a beak that is relatively small in relation to their body, the dispenser tray could theoretically have very small dimensions, so that said dispenser trays could be regarded as pointed in relation to the surface area of the poultry house. However, for physical reasons that will be clear to persons skilled in the art, the down pipe must have a certain minimum diameter in order to ensure unimpeded feed conveyance, and the dimensions of the tray must be at least greater than those of the down pipe, in order to ensure that the tray receives feed flowing out of the down pipe. In addition, the horizontal dimensions selected for the tray must be so much greater than the diameter of the down pipe that it is ensured that each tray has a feed presentation section which is situated, at least in vertical projection, on the floor surface next to the down pipe, in order to ensure in this way that the birds can move their heads above the feed without being obstructed. All this means that the tray has certain minimum dimensions and consequently takes up a finite part of the surface area of the floor of the poultry house.

The term "shape" of the dispenser tray will be used below to convey the contour of the vertical projection of said dispenser tray on the floor of the poultry house, from the normal position of the dispenser when in use. In addition, the term "surface area" of the dispenser tray will be used below to convey the surface of said projected shape, and the term "circumference" will be used to convey the circumference of said projected shape. Dispenser trays nowadays are almost always a circular shape.

As stated above, the birds crowd in a circle around the dispenser trays while they are feeding. The distances between successive dispenser trays of one feed conveyor pipe are then selected so that they are at least large enough to ensure that the birds standing around said adjacent dispenser trays do not obstruct each other. In the case of chickens, for example, said distance from edge to edge typically lies in the region of 40 cm.

Thus the minimum distance between the successive feed points along a feed conveyor line is determined by the size of the birds, on the one hand, and the diameter of the dispenser trays, on the other hand. With a typical tray diameter of approximately 35 cm, this leads to a minimum distance of 75 cm (centre to centre) between the successive feed points. This distance between feed points, also indicated below by the term "dispenser pitch" is the determining factor for the maximum number of feed points that can be provided along the length of the feed conveyor pipe, in other words the length of the poultry house concerned.

It will also be clear that each dispenser tray can provide only a limited number of birds with feed simultaneously. Said number corresponds to the number of birds in a circle around the dispenser tray if the birds are standing shoulder to shoulder. That number is typically of the order of 10 to 20. All this means a limit to the total number of birds that can be housed in a particular poultry house.

The number of birds that can be fed in the poultry house could be increased by reducing the dispenser pitch of the successive feed points along the feed conveyor pipes, since this means that more feed points can be provided in the poultry house. It would, however, mean a reduction of the distances between the individual successive dispenser trays, and that means that the birds would be obstructed in their freedom to move around in the poultry house.

As an alternative, the number of birds that can be fed in the poultry house could be increased by increasing the diameter of the pans, thereby also lengthening the circumference and making it possible for more birds to stand in the circle around the dispenser tray. However, the effect of this would only be limited, because the pitch of the dispensers would then also have to be increased. Moreover, the birds would then no longer be able to peck up the feed lying far away from the edge, which would mean a reduction of the economic efficiency of the dispensers. Furthermore, a larger dispenser tray inevitably means the use of more material, and thus higher costs.

Broadly speaking, the fact is that the total number of birds that can be housed and fed in a poultry house is proportional to the total length of the circumferences of all dispenser trays set up in the poultry house. In the case of the current designs the basic idea was that each bird had to have as much feed as possible at its disposal, and therefore that the ratio of tray surface area to tray circumference had to be as great as possible. This consideration led to the current designs in which the tray is circular; it is a known fact that the circle is an arithmetical figure with the greatest possible ratio of surface to circumference. However, the feeding surface taken up in the poultry house by the dispenser trays means a restriction of the space that the birds have to move around. The free living space for the birds can be defined as the total surface area of the poultry house minus the total surface area taken up by the dispenser trays. The more surface area taken up by the dispenser trays, the less living space will be left over for the birds.

A feed dispenser according to the preamble of claim 1 is known, for example from FR-A-2,680,949, which discloses a feed dispenser with an elongate, rectangular dispenser tray. The feed dispenser further comprises a down pipe, the bottom end edge of which is also an elongate, rectangular shape.

A disadvantage in this case is that the living and feeding surface areas available in a poultry house are still limited. The birds stand with the broadest parts of their bodies, i.e. their shoulders, against each other along the straight circumferential edge areas of the dispenser tray while they are feeding. The total available length at the circumferential edge of the dispenser tray is utilized inefficiently as a result of this. While the birds are feeding their heads are positioned at relatively great distances from each other, distances corresponding to the breadths of the shoulders of the birds.

SUMMARY OF THE INVENTION

It is a general object of the present invention to provide an improved feed dispenser in which the abovementioned problems are reduced or even eliminated.

The present invention is based on a totally different design idea. Instead of the idea of offering as much feed as possible per bird, the present invention is based on the idea of admitting as many birds as possible to the feed, whilst still ensuring that each bird receives sufficient feed. The present invention aims to provide a feed distribution system that is improved compared with known feed distribution systems by having improved efficiency and improved animal-friendliness. More particularly, the present invention aims to provide a feed distribution system that with a certain available poultry house surface area is capable of feeding greater numbers of birds and at the same time guaranteeing those birds more exercise space.

In order to ensure that a large number of birds can be provided with feed in the poultry house, a relatively great total length of the circumferences of all dispenser trays must be selected. In order to make the exercise space available for the birds as great as possible, the floor surface area taken up by the dispenser trays must be as small as possible. In complete contrast to the current designs, these apparently conflicting considerations lead to the design criterion that the ratio of tray circumference to tray surface area must be great.

Based on these design criteria, the present invention provides an improved feed dispenser according to claim 1. According to the present inventive idea, the dispenser tray has areas where the circumferential edge has a relatively large radius of curvature and areas where the circumferential edge has a relatively small radius of curvature. The curved circumferential edge areas with differing radii of curvature advantageously make it possible to make efficient use of the space available in a poultry house. The living and feeding surface areas for the birds can consequently be optimised. The birds standing beside each other along the curved circumferential edge areas of the dispenser tray while they are feeding are positioned with their heads at distances from each other that are smaller than their shoulder breadths, while the abovementioned disadvantages of circular dispenser trays are overcome.

In a distribution system according to the present invention the successive dispensers are preferably disposed in such a way that the abovementioned edge parts of adjacent dispenser trays with relatively large radius of curvature are directed substantially parallel to each other, the common direction being able to form an angle with the longitudinal direction of the feed conveyor pipes. Said angle is preferably equal to 90°, but it can also have another value. In a certain preferred embodiment the shape of the dispenser tray is elongate. In a feed distribution system such an elongate dispenser tray is then preferably disposed in such a way that the longitudinal direction of each dispenser tray is directed substantially perpendicularly to the longitudinal direction of the feed conveyor pipes.

Further preferred embodiments of the feed dispenser and of a feed distribution system comprising such a feed dispenser are set out in the subclaims.

These and other aspects, features and advantages of the present invention will be explained in greater detail by the description that follows of preferred embodiments of a feed dispenser and feed distribution system according to the invention with reference to the drawing, in which identical reference numerals indicate identical or comparable components, and in which:

DETAILED DESCRIPTION

Figure 1:
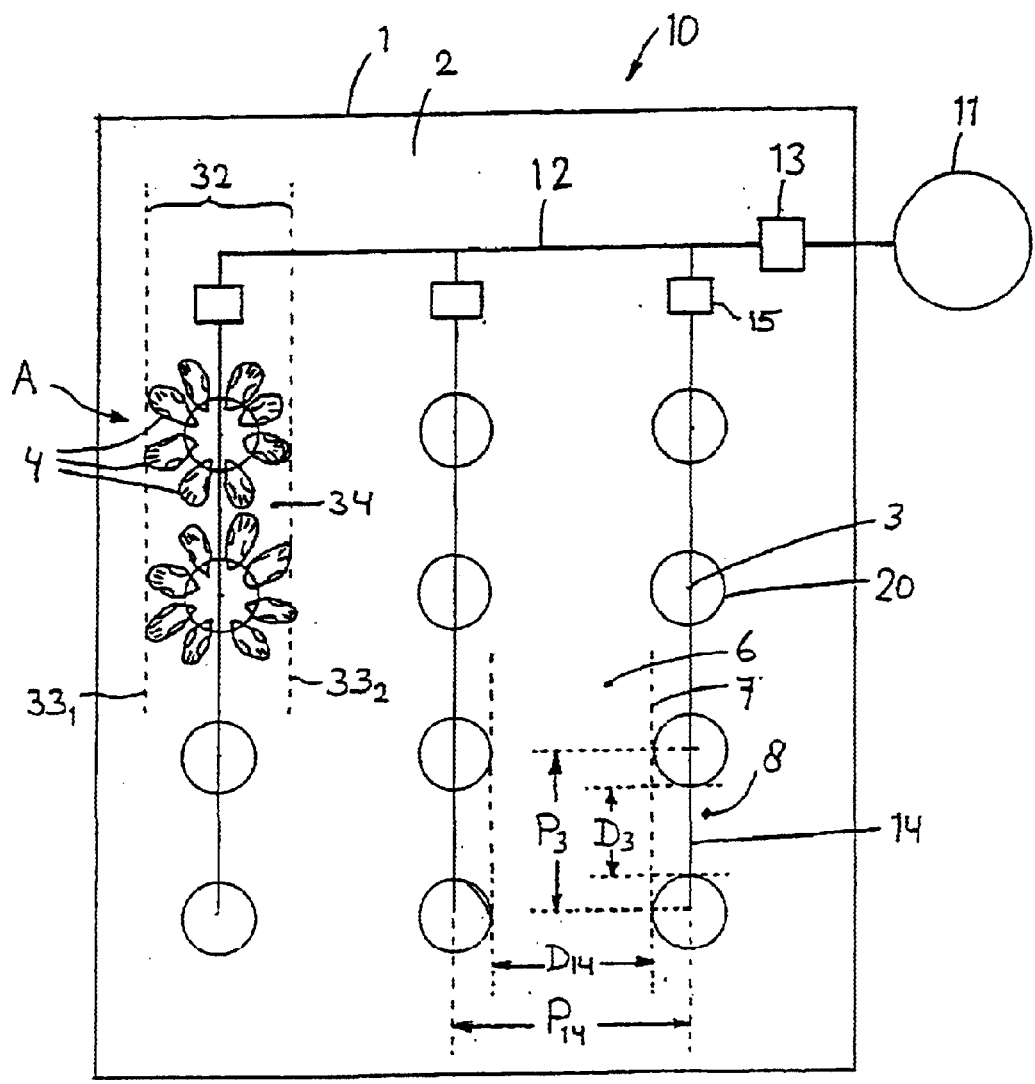
FIG. 1 shows diagrammatically a top view of a poultry house with dispensers according to the prior art.

FIG. 1 shows diagrammatically a top view of a poultry house 1 with a floor 2, which poultry house is provided with a regular pattern of feed points 3 for poultry 4. A feed dispenser 20 of a feed distribution system 10 for feed in powder form or granule form is present at each feed point 3. The feed distribution system 10 comprises in its entirety a number of feed conveyor pipes 14 (in the example illustrated: three), which are disposed parallel to each other and are connected by way of a common main pipe 12 to a storage bin 11, which is generally situated outside the poultry house 1. The main pipe 12 is provided with a main feed conveyor 13, such as, for example, a conveyor worm or spiral conveyor or chain system, and the feed conveyor pipes 14 are each provided with a corresponding feed conveyor 15. The feed conveyors 13 and 15 are indicated only diagrammatically in FIG. 1 as a block corresponding to the feed conveyor pipe 12 or 14 concerned. Since such feed conveyor systems are known per se, and the type of conveyor means in said conveyor pipes does not constitute a subject of the present invention, this subject need not be explained in any further detail here.

The feed points 3 are situated at a regular mutual distance $P_3$ along the feed conveyor pipes 14. The distance between the individual feed conveyor pipes 14 is indicated by $P_{14}$, and is also indicated by the term "pipe pitch" below. The pipe pitch $P_{14}$ is generally greater than the dispenser pitch $P_3$. For the sake of simplicity, only four feed points per feed conveyor pipe are shown in FIG. 1; in a real situation that number will be far greater.

Figure 2:
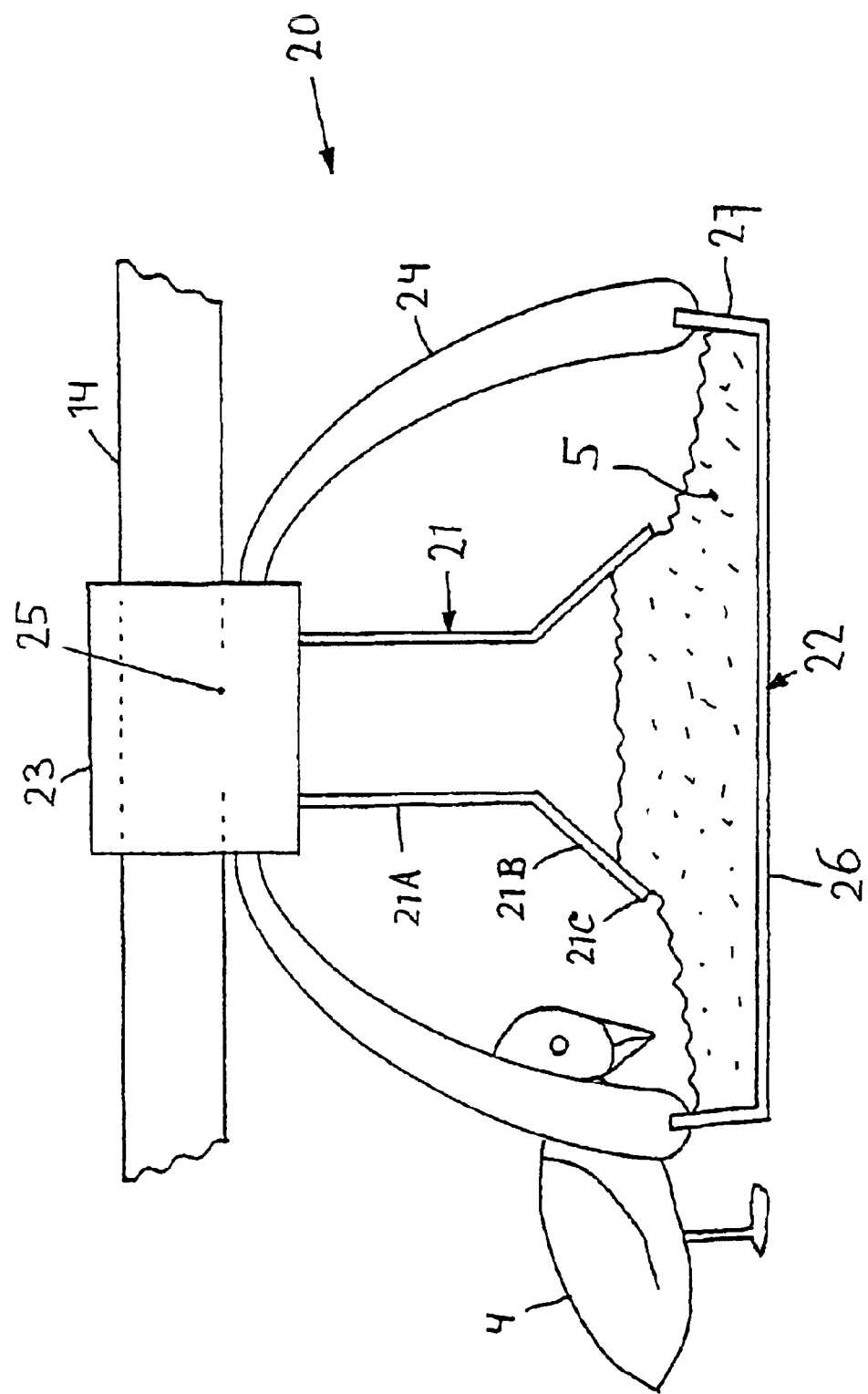
FIG. 2 shows diagrammatically a cross section of a dispenser.

As diagrammatically illustrated in FIG. 2, a feed dispenser 20 comprises a dispenser tray 22 with a substantially vertically oriented down pipe 21 disposed above it. The top end of the down pipe 21 is connected to an outlet 25 of the feed conveyor pipe 14. The bottom part of the down pipe 21 usually has a divergent shape. The bottom end of the down pipe 21 is situated above a central part of the dispenser tray 22.

The dispenser tray 22 is attached directly or indirectly by means of bearing arms 24 to the feed conveyor pipe 14. In the example shown the top end of the down pipe 21 is attached by means of a connecting element 23 to the feed conveyor pipe 14, and the dispenser tray 22 is attached by means of bearing arms 24 to said connecting element 23. The combination of connecting element 23, down pipe 21, bearing arms 24 and dispenser tray 22 forms a dispenser unit.

The dispenser tray 22 has a bottom 26 and an edge 27. During use, feed 5 in powder form or granule form will be conveyed out of the feed conveyor pipe 14 and through the down pipe 21 onto the bottom 26 of the dispenser tray 22. The idea is for a bird 4, such as, for example, a chicken, a turkey etc., standing outside the dispenser tray 22 to be able to peck up the feed 5 from the dispenser tray 22. To do this, a number of birds 4 stand in a circle around the dispenser tray 22, as shown diagrammatically at A in FIG. 1. It should be clear that the exact maximum number of birds that can stand in such a circle will depend, inter alia, on the dimensions of the dispenser tray 22 and the dimensions of the birds 4.

The distance $D_3$ between individual successive dispenser trays 22 is selected to be such that the birds standing around two successive dispenser trays 22 will cause little or no obstruction to each other. As explained earlier, that means an upper limit on the number of dispensers 20 that can be set up in the poultry house 1, and thus an upper limit on the number of birds $N_4$ that can be housed in the poultry house 1. Said upper limit corresponds to a situation in which all birds feed simultaneously. In principle, it can be said that the maximum number of birds $N_4$ that can be housed in the poultry house 1 corresponds to the following formula 1:

$$N_4 = 8 N_3 \cdot L_{27} \tag{1}$$

in which $N_3$ is the number of feed points 3,
$L_{27}$ is the circumference of each dispenser tray 22,
and 8 is a proportionality factor that depends on the shape and dimensions of the birds 4.

If it is desired to house greater numbers of birds 4 in the poultry house 1, it is therefore necessary either to increase the number $N_3$ of feed points 3 or to place dispenser trays 22 with larger circumference. In the case of circular dispenser trays 22 a larger circumference means a larger diameter. The placing of larger dispenser trays 22 means that the distance $D_3$ between individual successive dispenser trays along a feed conveyor pipe 14 becomes smaller, and therefore that the birds 4 are going to obstruct each other during feeding. The same applies to the reduction of the dispenser pitch $P_3$.

In principle, it would be technically possible to reduce the pipe pitch $P_{14}$, and therefore provide several feed conveyor pipes 14 in the poultry house 1. However, this is, on the one hand, at the expense of the free space $D_{14}$ between successive feed conveyor pipes 14 and, on the other hand, means a substantial investment, since an entire conveyor line, including the corresponding conveyor, now has to be put in position.

When the birds are not feeding, they can in principle scratch around on the floor 2 of the poultry house 1. While doing so, they have at their disposal strip-shaped exercise areas 6 with breadth $D_{14}$, defined by lines 7 running parallel to the feed conveyor pipes 14 and touching the dispenser trays 22. The birds 4 can move from one exercise area 6 to the adjacent exercise area 6 by way of passing areas 8 with breadth $D_3$ between two successive dispenser trays 22 of the same feed conveyor pipe 14. It should be clear that the exercise area 6 and the passages 8 will be smaller if the number of feed points 3 is increased and if the dimensions of the dispenser trays 22 are increased. If, therefore, the number of birds in the poultry house 1 is increased again, this means in the end a considerable reduction of the exercise area per bird.

In general, it can be said that the free living space $A_4$ for the birds 4 in the poultry house 1 corresponds to formula 2:

$$A_4 = A_2 - N_3 \cdot A_{22} \tag{2}$$

in which $A_2$ is the maximum available floor surface area of the floor 2, and in which $A_{22}$ is the surface area of the dispenser tray 22. As already mentioned above, this surface area is defined as the surface area of the perpendicular projection of the dispenser tray 22 on the floor 2.

In the prior art the design of the dispenser tray 22 is based on the idea that as much feed as possible must be made available per bird. The total feed quantity $X_5$ offered to the birds at a particular moment will correspond to the following formula 3:

$$X_5 = \forall \cdot N_3 \cdot A_{22} \tag{3}$$

in which $\forall$ is a proportionality factor.

The idea of making the feed quantity $X_5$ per bird as great as possible means striving for a maximum $X_5/N_4$ ratio, or a maximum $A_{22}/L_{27}$ ratio. This has led to the dispenser trays 22 according to the prior art having a circular contour, as shown in FIG. 1.

According to the insights of the present invention, that circular form is not, however, ideal. In the first place, it can be seen in FIG. 1 that optimum use is not being made of the surface area of the floor 2 during feeding. FIG. 1 shows subsidiary lines 33₁ and 33₂, extending parallel to a feed conveyor pipe 14 and touching the rear ends of the birds 4, which are standing in circles around the dispensers 20 belonging to said feed conveyor pipe 14. A feeding strip 32 will be defined as the strip-shaped part of the floor 2 bounded by said lines $33_1$ and $33_2$. It can be seen clearly in FIG. 1 that the birds 4 are not making full use of the feeding strip 32. More particularly, there is always an hourglass-shaped surface part 34 of the feeding strip 32 between two successive feed points 3 that is not being used.

In addition, it can be seen from formula 2 that maximizing the ratio $A_{22}/L_{27}$ is accompanied by minimizing the ratio $A_4/L_{27}$. In general, it can be said that the dispenser trays 22 constitute a restriction of the free living space in the situation where the birds 4 are not feeding, but are freely scratching around in the poultry house 1.

The present invention provides a feed distribution system for feeding poultry that is improved in terms of economic efficiency, which system makes it possible to house and feed more birds in a particular poultry house with a predetermined poultry house surface area.

The present invention also provides an improved feed distribution system for feeding poultry that makes it possible for the welfare of the birds in the poultry house 1 to be improved by increasing the available feeding space per bird and also the available living space per bird.

The present invention is based on the insight that the abovementioned advantages can be achieved if a relatively great length is selected for the available feeder length $L_{27}$, under the precondition that adequate feed must always be within reach of each bird.

Based on this insight, the dispensers 20 according to the present invention are improved compared with the known dispensers with circular dispenser trays, by the fact that the dispenser trays 22 according to the present invention are not circular, but are designed with circumferential edge areas curved in a convex manner with differing radii of curvature.

Within this basic idea many different variants of embodiments are possible, a number of which will be explained below.

Figure 3:
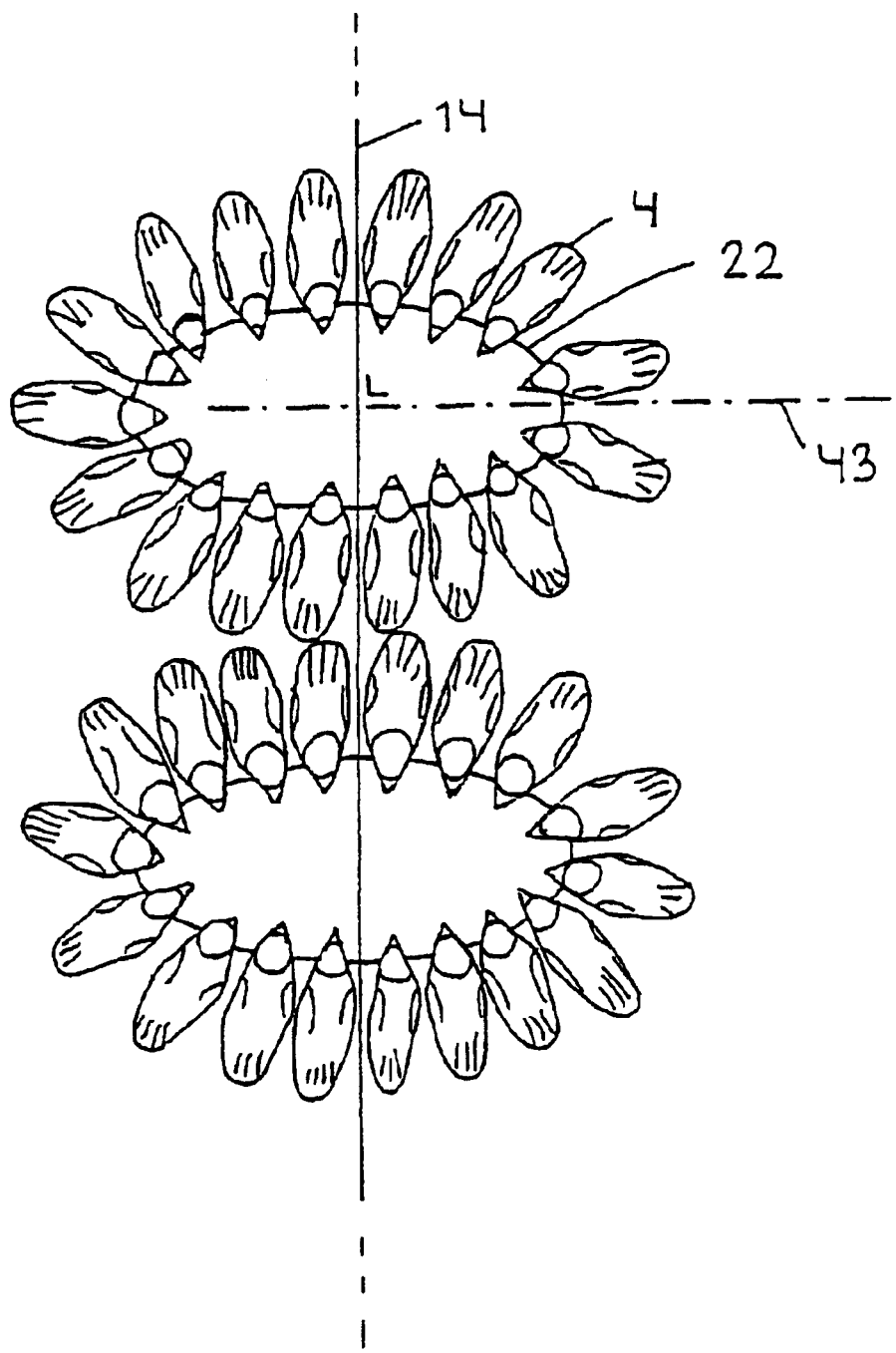
FIG. 3 shows diagrammatically a top view of two adjacent dispensers according to an embodiment of the present invention.

FIG. 3 shows a diagrammatic top view of a part of a feed conveyor line 14 with two adjacent dispensers according to one embodiment of the present invention, on a larger scale than that of FIG. 1. It can be seen clearly in FIG. 3 that the dispenser trays 22 are elongate, unlike the circular dispenser trays 22 of the prior art, as illustrated in FIG. 1. It is pointed out that the view in cross section of the dispenser with circular dispenser tray shown in FIG. 2 also applies to the dispenser according to the invention with elongate dispenser tray shown in FIG. 3.

Figure 4:
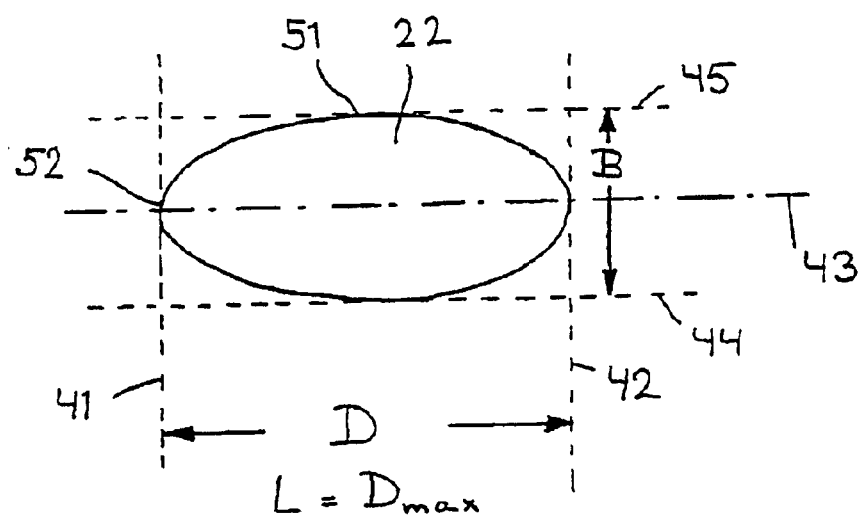
FIG. 4 shows diagrammatically a top view of an elongate dispenser according to the present invention.

The term "elongate" as referred to in the context of the present invention will now be explained in greater detail with reference to FIG. 4. FIG. 4 shows a diagrammatic top view of a dispenser tray 22, and two lines 41 and 42, which are parallel to each other and touch the circumference of the dispenser tray 22, and which in the process, as it were, wedge in said dispenser tray 22 between them. The mutual distance between the two contact lines 41, 42 is indicated by the letter D in FIG. 4. Said mutual distance will be dependent upon the orientation of the dispenser tray 22: if the dispenser tray 22 is rotated about a vertical axis, in other words an axis of rotation perpendicular to the plane of drawing, the mutual distance between the two contact lines 41, 42 will vary. At a particular rotated position of the dispenser tray 22 relative to the two contact lines 41, 42 said mutual distance D is at its maximum. In that particular rotated position the direction perpendicular to said two contact lines 41, 42 then defines a longitudinal axis 43 of the dispenser tray 22, and the corresponding maximum mutual distance between the two contact lines 41, 42 will be indicated as the length L of the dispenser tray 22.

The breadth B of the dispenser tray 22 will be defined as the dimension measured, perpendicular to the abovementioned longitudinal axis 43, between two parallel contact lines 44, 45.

The dispenser tray 22 will be described as being "elongate" when the length L defined in this way is greater than the breadth B defined in this way.

It is preferable for the dispenser tray 22 to have a convex curvature along its entire edge 27, which means that the convex side of said curvature is directed outwards.

In a suitable embodiment the dispenser tray 22 is an elliptical shape.

As mentioned earlier, the present invention provides an advantage by the fact that the dispenser tray is not circular, more particularly by the fact that the dispenser tray is elongate. The degree of its elongation, which in the context of the present invention will be defined as the ratio of the length as defined above to the breadth as defined above, or L/B, is then greater than 1. The dispenser tray 22 preferably has a degree of elongation L/B in the region of approximately 1.2 to approximately 1.5.

As shown in FIG. 3, the elongate dispenser trays 22 are oriented in such a way relative to the feed conveyor pipes 14 that the longitudinal axis 43 of each dispenser tray 22 forms an angle greater than zero with the longitudinal direction of said feed conveyor pipes 14. Ideally, and as shown, said angle is approximately 90°. It can be seen that better "capacity utilization" of the floor surface area is now achieved. With the same mutual distance between adjacent dispenser trays 22, more birds can be accommodated per dispenser 20. The living surface area available to the birds can also be increased.

According to the present invention, the dispenser tray 22 has first edge areas 51 with a relatively large radius of curvature and second edge areas 52 with a relatively small radius of curvature. Such edge areas are present in the case of the elliptical embodiment illustrated in FIGS. 3 and 4. In this case the first edge areas 51 of adjacent dispenser trays 22 face each other, and are situated substantially perpendicular to the feed conveyor lines 14. There will, however, also be other configurations, in the case of which areas with relatively small radius of curvature face each other, and are therefore situated substantially perpendicular to the feed conveyor lines 14, while areas with relatively large radius of curvature are situated at a transversal distance from said feed conveyor pipes 14.

Although this is not essential, the feed dispenser tray 22 is preferably symmetrical in construction. In the case of the elliptical embodiment discussed above the dispenser tray 22 has twofold rotational symmetry, which means that the shape returns to the same shape after rotation through 180°. In a special embodiment the dispenser tray 22 has threefold rotational symmetry, which means that the dispenser tray 22 always returns to the same shape after rotation through 120°. The dispenser tray 22 then has in its entirety a curved triangular shape with sides 61 and corner areas 62, as illustrated diagrammatically in FIG. 5. The corner areas 62 are rounded, so that they correspond to the earlier mentioned second edge areas 52 with relatively small radius of curvature. The sides 61 are also curved in a convex shape, and correspond to the earlier mentioned first edge areas 51 with relatively large radius of curvature.

Figure 5:
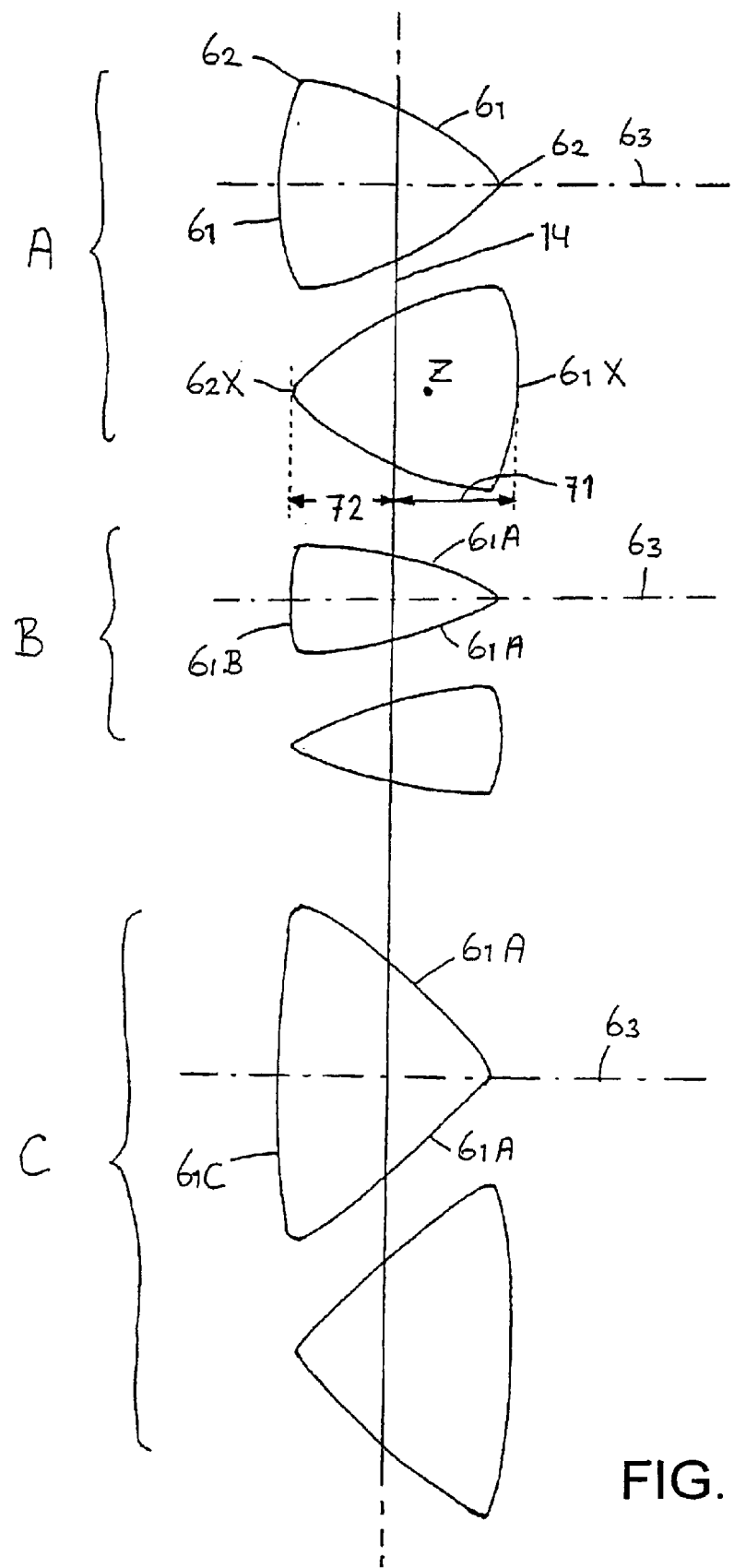
FIG. 5 shows diagrammatically a top view of a number of substantially triangular dispensers according to the present invention.

In the case of threefold rotational symmetry said sides 61 are of mutually equal lengths, as illustrated at A in FIG. 5. It is, however, possible for the dispenser tray 22 to have two equal sides 61A and a third side 61B of shorter length, or a third side 61C of longer length, as illustrated in FIG. 5 at B and at C respectively. In that case there is no question of rotational symmetry, but only of a mirror symmetry relative to a plane of symmetry 63 perpendicular to said third side 61B, 61C.

As shown in FIG. 5, the successive dispenser trays 22 are then preferably mounted relative to the feed conveyor pipes 14 in such a way that said plane of symmetry 63 is directed substantially perpendicularly to said feed conveyor pipes 14, in which case the orientation of successive dispenser trays 22 is then continually alternating. In this way it is ensured that the first and second sides 61A of adjacent dispenser trays 22 run substantially parallel to each other, at an angle relative to the feed conveyor pipe 14.

Figure 5A:
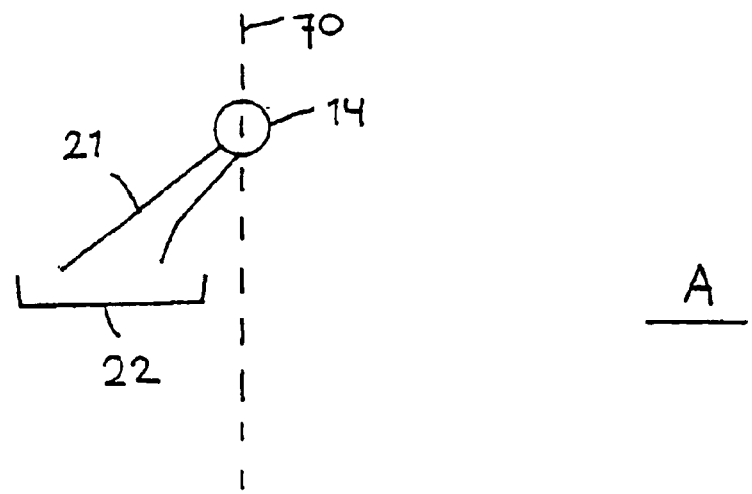
FIG. 5A shows a diagrammatic cross section of a feed conveyor pipe with dispenser tray placed below it.
Figure 5A:
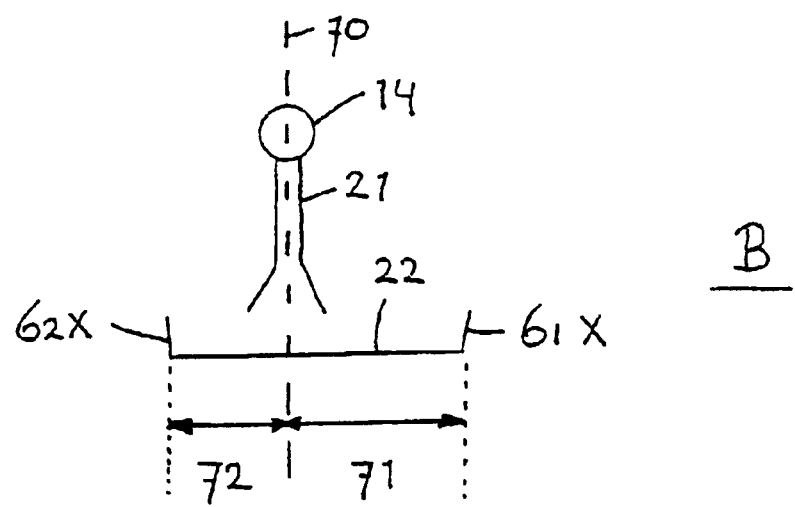

In FIG. 5A an imaginary vertical plane through a conveyor pipe 14 is indicated by reference numeral 70. In principle, it is possible for a dispenser tray 22 to be situated entirely beside said plane 70, in which case the down pipe 21 will then be positioned at an angle, as illustrated at A in FIG. 5A. It is, however, preferable for the down pipe 21 to run in a substantially vertical direction, coinciding with said plane 70, in which case the dispenser tray 22 is situated below the conveyor pipe 14 and is intersected by the plane 70 in two imaginary parts 71, 72, as illustrated at B in FIG. 5A. In the event of the dispenser tray 22 having a triangular shape, there is then always one edge area 61 that is not intersected by said plane 70; this edge area will also be indicated below by the term transversal outermost edge part 61X (see also FIG. 5). The opposite edge part 62 with relatively small radius of curvature, which is therefore situated on the other side of said plane 70, will also be indicated below by the term transversal outermost corner part 62X.

The breadths (in other words, the transversal dimension perpendicular to the plane 70) of said two imaginary parts 71, 72 can be identical to each other. This is applicable particularly where the dispenser tray 22 is of an elliptical shape, but can also be applied where the dispenser tray 22 is of a triangular shape.

A shape centre of gravity Z can be defined for each tray shape in the manner customary in mathematics (see FIG. 5). For good distribution of the feed in the dispenser tray 22 it may be desirable for the down pipe 21 to open out above said centre of gravity Z. The successive dispensers 20 can be disposed in such a way that their respective centres of gravity Z are situated in one line, which line is situated, for example, in said plane 70. In that case, in the case of triangular trays 22, the breadths of said two imaginary parts 71, 72 differ from each other. More particularly, the breadth at the side of the transversal outermost edge part 61X is then less than the breadth at the side of the transversal outermost corner part 62X.

Figure 5B:
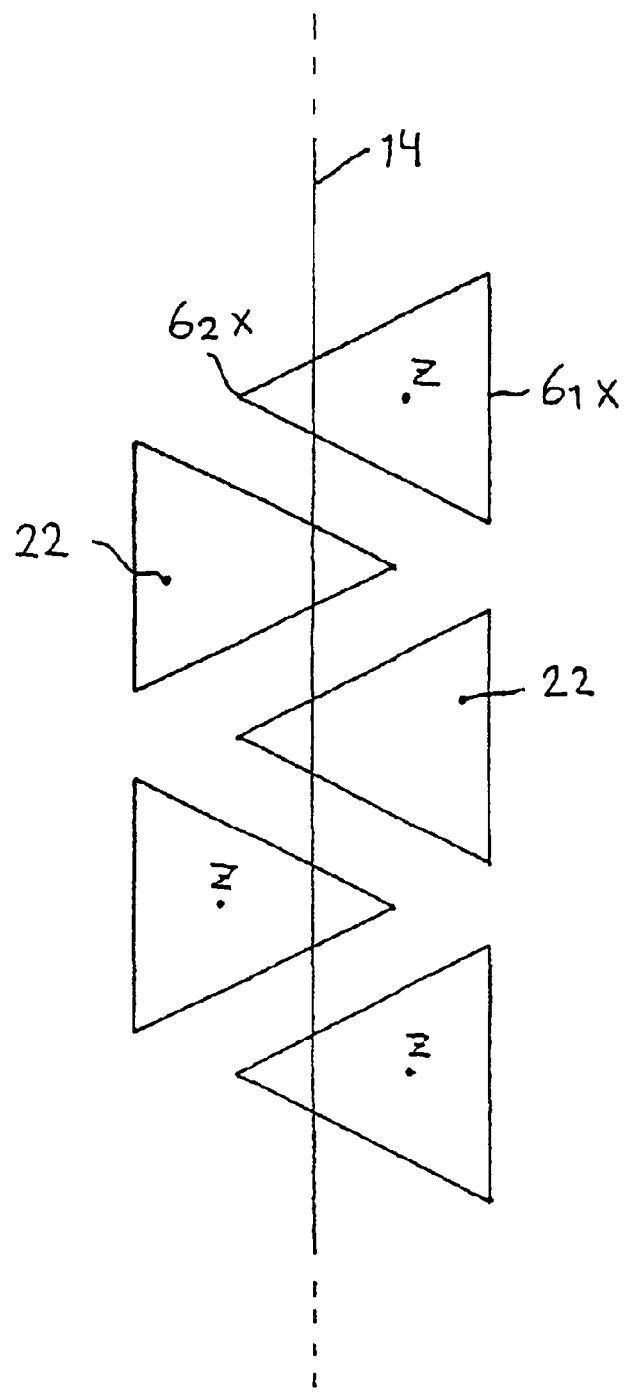
FIG. 5B is a diagrammatic top view that is comparable to FIG. 5, illustrating an efficient arrangement of substantially triangular dispenser trays.

In the case of triangular dispenser trays better utilization of the floor surface area is, however, achieved if the dispenser trays are in fact displaced in opposite directions relative to said plane 70, because the dispenser pitch can then be reduced. In that case the transversal distance from a corner point 62X of the dispenser tray 22 to said plane 70 is therefore less than the transversal distance from the opposite edge part 61X to said plane 70, as illustrated in FIG. 5B. The centres of gravity Z of successive dispenser trays 22 are then situated on either side of said plane 70.

In this way the present invention provides a feed distribution system with feed dispensers 20 that have a convex edge 27 with successive edge areas 61 which have a relatively large radius of curvature and edge areas 62 which have a relatively small radius of curvature. A suitable shape in this connection is an elliptical shape, a curved triangular shape, a hexagonal shape etc. The invention provides improved animal welfare, inter alia through a larger feeding space and also larger living space when the birds are not feeding. The invention further provides improved economic efficiency for the breeder, inter alia by reduced costs per bird.

A further aspect of the present invention relates to the down pipe, indicated in FIG. 2 by reference numeral 21. Said down pipe has in its entirety a diverging cross section, which in this case means that the inner cross section at a top end, at the position where the down pipe 21 connects to the horizontal feed conveyor pipe 14, is smaller than it is at the bottom end of the down pipe 21, which bottom end will be situated in the vicinity of the bottom 26 of the dispenser tray 22. In the case of known feed dispensers the down pipe 21 generally has a top down pipe part 21A that is of a cylindrical design, and a bottom down pipe part 21B that is the shape of a surface of a cone. The bottom end edge of said bottom down pipe part then defines the outflow aperture of the down pipe, and said bottom end edge of the down pipe in the case of known feed dispensers is generally a circular shape. According to a preferred aspect of the present invention, said bottom end edge is non-circular in shape, being substantially the same shape as the dispenser tray 22. The shape of the bottom end edge of the down pipe 21C and the shape of the dispenser tray 22 are preferably matched in such a way that the horizontal distance between the edge 27 of the dispenser tray 22 and the bottom end edge of the down pipe 21C, measured perpendicular to the edge 27 of the dispenser tray 22, is substantially the same over the entire circumference of the dispenser tray 22.

When poultry is being fed by means of a feed distribution system of the type described above, the intention is that the dispensers 20 should be used not only for the somewhat older birds, but also for the young birds. The older birds generally have no difficulty in finding the feed in the dispenser trays. On the one hand, these older birds are larger, so that they can easily look over the edge 27 of the dispenser trays 22 and in this way see the feed 5 lying in the dispenser tray 22. On the other hand, these birds are used to the feed distribution system, and they know that feed can be obtained in the dispenser trays 22. The same feed dispensers are, however, used already in the first days of life of the poultry. One-day-old chicks have more difficulty in finding the feed being offered, on the one hand because they do not yet know that feed can be obtained in the dispenser tray 22, and on the other hand because they cannot easily look over the edge 27 of the dispenser tray 22, and therefore cannot easily see the feed lying there. Since it is important for efficient rearing of the birds that they have sufficient to eat right from the first day of their life, the present invention aims to improve a feed dispenser in such a way that one-day-old chicks can find their feed more easily.

Figure 6A:
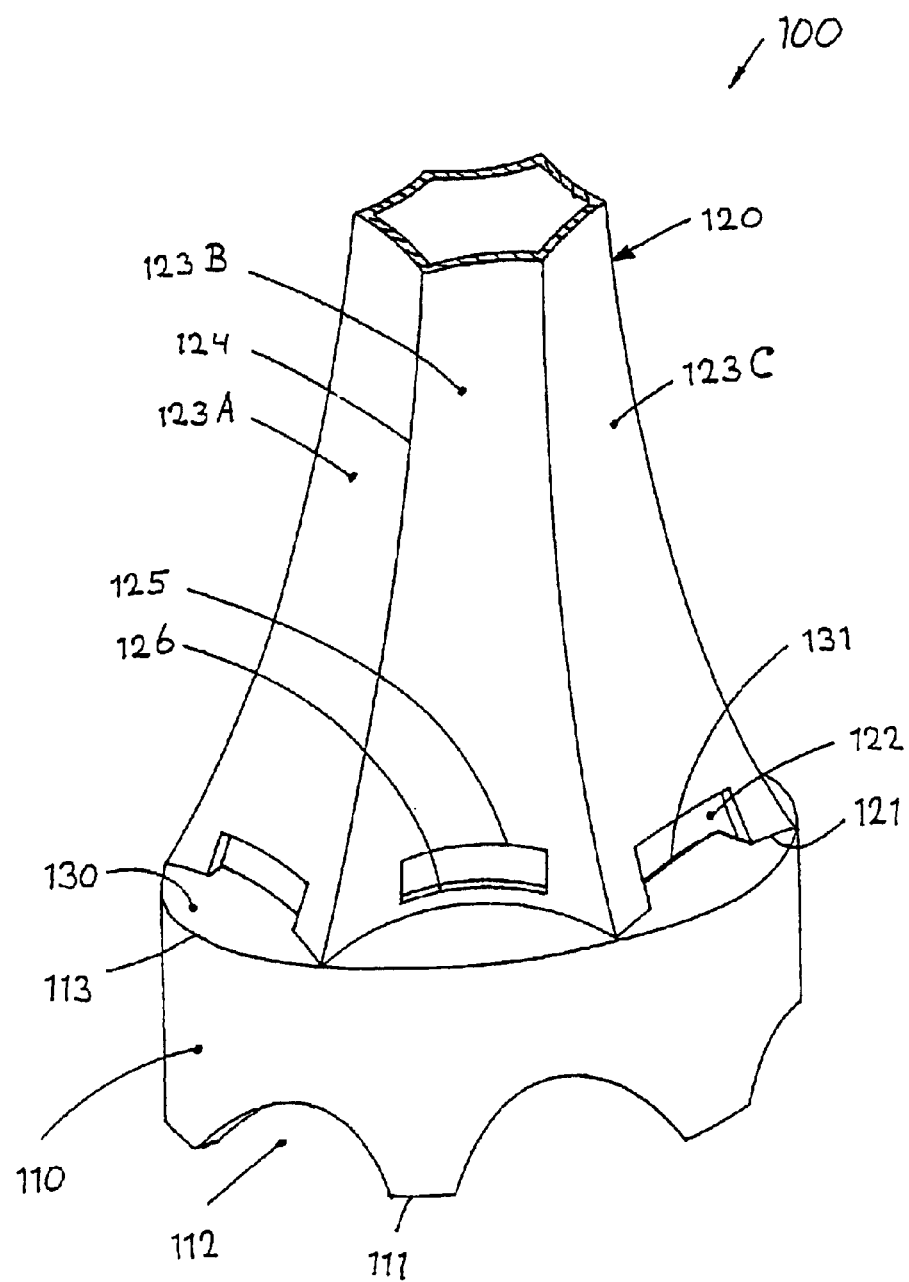
FIG. 6A shows diagrammatically a perspective view of a down pipe.
Figure 6B:
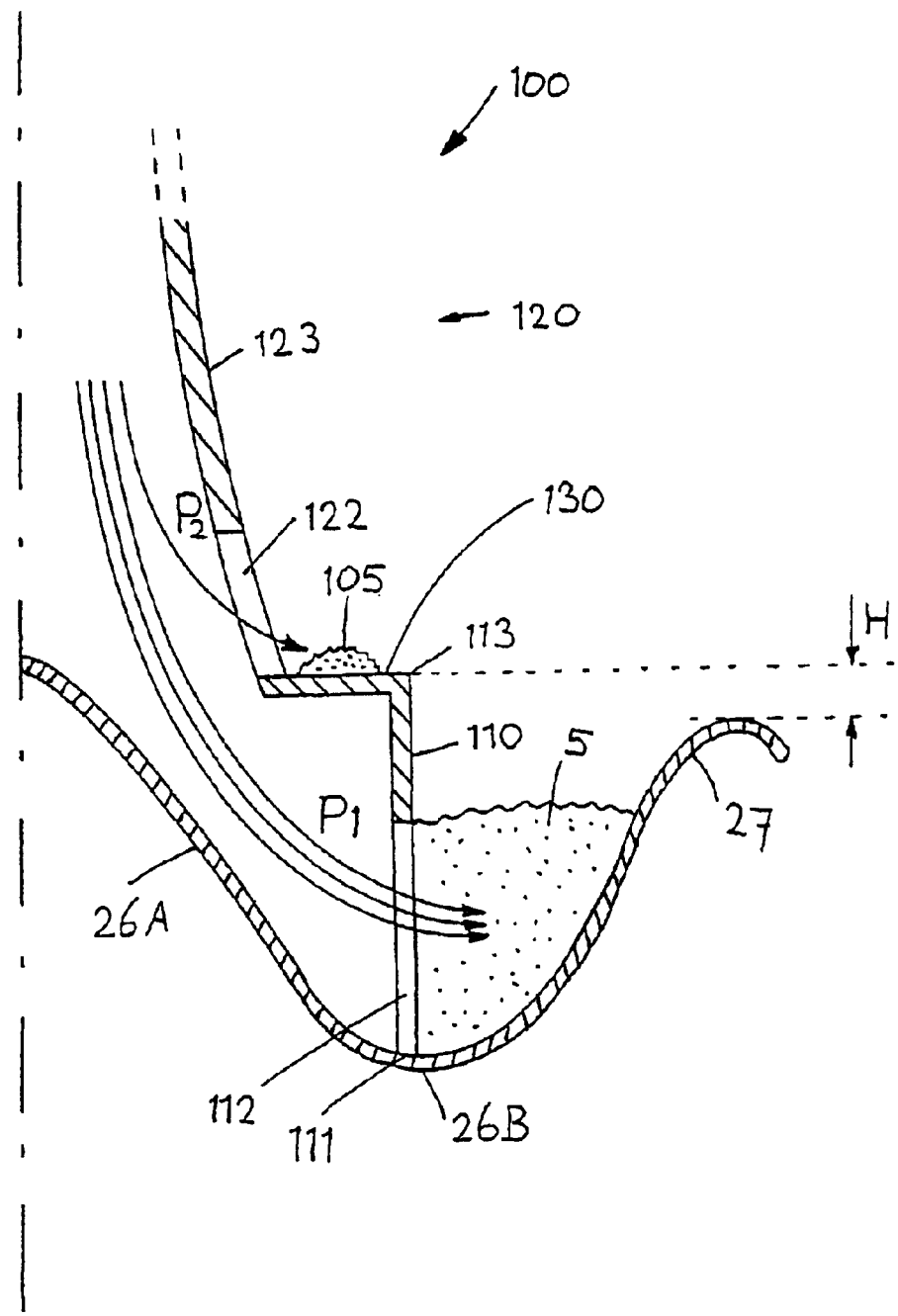
FIG. 6B shows diagrammatically a cross section of a wall part of the down pipe of FIG. 6A.

FIG. 6A is a diagrammatic perspective view of a down pipe improved in this respect according to the present invention, indicated in its entirety by the reference numeral 100. Said down pipe 100 comprises a bottom wall part 110 with a bottom end edge 111, provided with openings 112 acting as through-flow apertures. FIG. 6B shows diagrammatically a cross section of the bottom part of the down pipe 100, placed on a dispenser tray 20. The bottom wall part 110 can be vertically oriented, as illustrated, but this is not essential.

FIG. 6B shows diagrammatically that the bottom 26 of the dispenser tray 22 can have a conical central part 26A, and a lowest bottom part 26B situated between said central part 26A and the edge 27. The contour of said lowest bottom part 26B can, as usual, be a substantially circular contour. Where the dispenser tray 22 has a non-circular contour, for example the elliptical shape or triangular shape discussed above as a preferred embodiment, the lowest bottom part 26B preferably has a circumferential contour corresponding to it.

FIG. 6B shows that in a certain operating state, in which the down pipe 100 has a vertically lowest position relative to the dispenser tray 22, the bottom end edge 111 of the down pipe 100 rests on the abovementioned lowest bottom part 26B of the dispenser tray 22. If feed falls from the horizontal conveyor pipe 14 through the down pipe 100 and falls into the dispenser tray 22, at least some of said feed 5 will pass the bottom wall part 110 of the down pipe 100 by way of said apertures 112, as indicated diagrammatically by the arrows PI, and in this way go into an annular space defined between the circumferential edge 27 of the dispenser tray 22 and the bottom wall part 110 of the down pipe 100.

This feed is easy to reach for birds standing outside the dispenser tray 22. One-day-old chicks have the problem, however, that they are still very small and therefore cannot easily see the feed 5 lying behind the edge 27. They therefore do not know that feed is obtainable behind said edge 27. In order to reduce this problem, the down pipe 100 is provided with a bait table 130 at the top end of the bottom wall part 110. The down pipe 100 has a top wall part 120 extending upwards from the bait table 130 to the connecting element 23, which is not, however, shown in FIGS. 6A and 6B. The top wall part 120 has a bottom edge 121, which defines an inside edge for the bait table 130, and is provided with through-flow apertures 122.

If feed falls out of the conveyor pipe 14 down into the down pipe 100, a portion of that feed falling down will leave the down pipe by way of the through-flow apertures 122 and fall onto the bait table 130, as shown diagrammatically by the arrow P2 in FIG. 6B. The bait table 130 is situated at a higher level than the top surface of the feed 5 in the abovementioned annular space between the bottom wall part 110 of the down pipe 100 and the edge 27 of the dispenser tray 22. In this way the feed 105 lying on the bait table 130 is easier for one-day-old chicks to see. The bait table 130 is preferably situated at a higher level than the top of the circumferential edge 27 of the dispenser tray 22, as indicated by the letter H in FIG. 6B. The height difference H need not be great: a height difference of the order of a few millimetres is sufficient. However, even if the bait table 130 is situated several millimetres lower down than the top of the circumferential edge 27, the feed 105 lying on the bait table 130 is easy for one-day-old chicks to see.

The ready visibility of the feed 105 lying on the bait table 130 is further improved if the bait table 130, and preferably the entire down pipe 100, is made in a light colour, because the feed used is largely a dark brown colour, so that there is then a good visual contrast between the feed 105 and the background.

The bottom edge 121 of the top wall part 120 of the down pipe 100 can have a contour that corresponds to the contour of the top edge 113 of the bottom wall part 110, so that the bait table 130 is substantially the same breadth over the entire circumference. However, it is preferable, as illustrated in FIG. 6A, for the top wall part 120 to have a polygonal circumferential contour at least over a part of its height, for example a hexagonal circumferential contour, as illustrated. It is shown in FIG. 6A that the top wall part 120 comprises six wall sections 123, which meet each other in intersecting edges 124. In the vertical direction the top wall part 120 is divergent, in other words the transverse measurements increase towards the bottom. In the example shown the wall sections 123 are curved in a concave manner in the vertical direction, in other words with the hollow side outwards.

The cross section of a wall section 123 with a horizontal plane can be a straight line part. It is preferable, as also shown in FIG. 6A, for the wall sections 123 also to be curved in a concave manner in the horizontal direction, in other words with the hollow side outwards. The bottom end edge 121 of each wall section 123 is consequently a concave line, which is curved in the opposite direction relative to the top edge 113 of the bottom wall part 10. It is preferable, as shown in FIG. 6A, for the intersecting edges 124 to end at the top edge 113 of the bottom edge part 110. In this way the bait table 130 is in fact subdivided in the circumferential direction into six successive table sections.

In the example of FIG. 6B the outermost circumferential edge of the bait table 130 connects precisely to the top edge 113 of the bottom wall part 110. Said top edge 113 of the bottom wall part 110 could also project slightly above the bait table 130, in order to retain more easily the feed 105 streaming onto it (P2).

On the other hand, the bait table 130 could project in the radial direction beyond the bottom wall part 110, in order to be able to offer a greater table surface in this way.

Each through-flow aperture 122 in the top wall part 120 has a top edge 125 and a bottom edge 126. Said bottom edge 126 can be situated in the vertical direction at the level of the bait table 130, as shown in FIG. 6A for a wall section 123A. It is also possible for said bottom edge 126 to be situated higher up than the bait table 130, so that below said bottom edge 126 of a through-flow aperture 122 a raised edge is present, with the result that the feed 105 flowing onto the bait table 130 is more easily retained, as shown in FIG. 6A, for a wall section 123B.

The through-flow apertures 122 can be in the form of a hole in the corresponding wall sections 123. Since the wall sections 123 in the example discussed are curved in a concave manner in the vertical direction, the bottom edge 126 of a through-flow aperture 122 is then situated further outwards in radial terms than the corresponding top edge 125. This can make it difficult for the feed 105 flowing downwards in the down pipe 100 to flow outwards (P2) through the through-flow aperture 122. Although the feed 105 on the bait table 130 primarily has only an enticing function, and the quantity of feed 105 on the bait table 130 need not therefore be large, it may be desirable for it to be so in order to promote the outflow of feed 105. To that end, the bottom edge 126 of a through-flow aperture 122 can be placed further inwards in radial terms, so that the bait table 130 has an inside edge 131 which in radial terms is situated within the down pipe 100, as shown in an exaggerated manner in FIG. 6A for a wall section 123C, in order in this way to be able to receive a greater part of the feed flowing downwards in the down pipe 100.

It will be clear to a person skilled in the art that the scope of the present invention is not limited to the examples discussed above, but that various changes and modifications thereof are possible without departing from the scope of the invention as defined in the appended claims.

What is claimed is:

1. Feed dispenser for feeding poultry, comprising a dispenser tray and guide means for guiding feed from a horizontal feed conveyor pipe to said dispenser tray, in which said dispenser tray is a non-circular shape, wherein said dispenser tray has a circumferential edge with first edge areas which have a relatively large radius of curvature and second edge areas which have a relatively small radius of curvature.

2. Feed dispenser according to claim 1, in which said dispenser tray is an elongate shape.

3. Feed dispenser according to claim 2, in which said dispenser tray is an elliptical shape.

4. Feed dispenser according to claim 1, in which said dispenser tray is substantially a curved triangular shape, preferably with threefold rotational symmetry.

5. Feed dispenser according to claim 1, in which said guide means comprise a down pipe with a bottom end edge of a non-circular shape, said bottom end edge having first edge areas with a relatively large radius of curvature and second edge areas with a relatively small radius of curvature.

6. Feed dispenser according to claim 5, in which said bottom end edge is an elliptical shape.

7. Feed dispenser according to claim 5, in which bottom end edge is substantially a curved triangular shape, preferably with threefold rotational symmetry.

8. Feed dispenser according to claim 5, in which said bottom end edge of said down pipe is substantially the same shape as said dispenser tray.

9. Feed dispenser according to claim 8, in which a horizontal distance between said bottom end edge of said down pipe and said edge of said dispenser tray is substantially the same over the entire circumference of said dispenser tray.

10. Feed distribution system, comprising at least one substantially horizontal feed conveyor pipe and a number of feed dispensers attached with mutual spacing to said feed conveyor pipe, said feed dispensers comprising a dispenser tray and guide means for guiding feed from a horizontal feed conveyor pipe to said dispenser tray in which said dispenser tray is a non-circular shape, wherein said dispenser tray has a circumferential edge with first edge areas which have a relatively large radius of curvature and second edge areas which have a relatively small radius of curvature.

11. Feed distribution system according to claim 10, in which said feed dispensers have a longitudinal axis which forms an angle greater than zero with a longitudinal direction of said feed conveyor pipe concerned.

12. Feed distribution system according to claim 11, in which said angle is substantially equal 90°.

13. Feed distribution system according to claim 10, in which said feed dispensers have a plane of symmetry which forms an angle greater than zero with a longitudinal direction of said feed conveyor pipe concerned.

14. Feed distribution system according to claim 13, in which said angle is substantially equal to 90°.

15. Feed distribution system according to 10, in which the orientation of successive dispenser trays is alternating.

16. Feed distribution system according to claim 10, in which a transversal distance of a corner point of a dispenser tray from a vertical plane through said conveyor pipe is shorter than a transversal distance of an opposite edge part from said plane.

* * * * *